US009286766B2

(12) United States Patent
Igesund

(10) Patent No.: US 9,286,766 B2
(45) Date of Patent: Mar. 15, 2016

(54) GAMING MACHINE

(71) Applicant: Pridefield Limited, Douglas (GB)

(72) Inventor: Terence Igesund, Durban (ZA)

(73) Assignee: Pridefield Limited (IM)

(*) Notice: Subject to any disclaimer, the term of this patent is extended or adjusted under 35 U.S.C. 154(b) by 132 days.

(21) Appl. No.: 14/039,992

(22) Filed: Sep. 27, 2013

(65) Prior Publication Data

US 2014/0094257 A1 Apr. 3, 2014

(30) Foreign Application Priority Data

Sep. 28, 2012 (GB) .................................. 1217422.3

(51) Int. Cl.
*A63F 13/00* (2014.01)
*G07F 17/34* (2006.01)
*G07F 17/32* (2006.01)

(52) U.S. Cl.
CPC ............ *G07F 17/34* (2013.01); *G07F 17/3265* (2013.01)

(58) Field of Classification Search
CPC .... G07F 17/32; G07F 17/326; G07F 17/3267
USPC ................................................ 463/20, 21, 42
See application file for complete search history.

(56) References Cited

U.S. PATENT DOCUMENTS

| | | | | |
|---|---|---|---|---|
| 6,251,013 | B1 * | 6/2001 | Bennett | 463/13 |
| 2006/0058097 | A1 | 3/2006 | Berman et al. | |
| 2006/0068881 | A1 * | 3/2006 | Casey | 463/20 |
| 2006/0121974 | A1 * | 6/2006 | Rodgers et al. | 463/16 |
| 2006/0189369 | A1 * | 8/2006 | Taylor | 463/16 |
| 2008/0132321 | A1 | 6/2008 | Pau | |
| 2009/0215515 | A1 * | 8/2009 | Meyer | 463/20 |
| 2011/0117989 | A1 | 5/2011 | Kennedy et al. | |

* cited by examiner

*Primary Examiner* — Allen Chan
(74) *Attorney, Agent, or Firm* — McDonnell Boehnen Hulbert & Berghoff LLP

(57) ABSTRACT

Disclosed herein are wager game machines and methods. In one example, a method involves: selecting a first symbol set from a global symbol group; displaying the first symbol set, wherein the first symbol set includes at least two symbols; determining that a trigger event has occurred; responsive to determining that the trigger event has occurred, identifying at least one symbol in the first symbol set that is in a replaceable symbol group which is a subset of the global symbol group; for the or each symbol in the first symbol set which is in the replaceable symbol group, selecting a replacement symbol that is in the global symbol group; and displaying a second symbol set consisting of (i) the symbols in the first symbol set which are not in the replaceable symbol group, and (ii) the or each replacement symbol.

17 Claims, 16 Drawing Sheets

GAMING MACHINE

PRIORITY

This application claims priority benefits under 35 U.S.C. §119 to United Kingdom Patent Application Serial No. 1217422.3 filed 28 Sep. 2012, which is hereby incorporated by reference.

TECHNICAL FIELD

This disclosure relates to gaming machines for playing wager games.

BACKGROUND

Wager games come in a variety of forms, including for example a mechanical slot machine. A mechanical slot machine may include one or more reels, each of which includes multiple symbols distributed around the circumference of the reel. When a player places a wager (e.g., by placing a coin in the machine), the player is allowed to spin the reels. Each reel then comes to rest, typically with either one of the symbols, or a space in between symbols, in alignment with a pay line. A predetermined winning symbol or a predetermined combination of winning symbols that are aligned with the pay line may result in the player winning the game and receiving a payout. In one example, the machine may include three reels, and the pay line may be a horizontal line disposed across a center of each of the three reels.

In another example of a wager game, a mechanical slot machine may present symbols in a matrix arrangement, with each symbol changing during a spin of the game. For example, the machine may have five columns and three rows of symbols, for a total of fifteen symbols. Such machines often have multiple pay lines, each being defined by a collection of positions within the matrix. For example, the machine may have three pay lines, each corresponding to one row of the matrix.

While slot machines were traditionally mechanical, modern slot machines often take the form of a video gaming machine (e.g., a dedicated gaming machine located in a casino) that includes a graphical user interface (GUI), and that may emulate a mechanical slot machine. With a video gaming machine, the GUI may include a display that displays an image of one or more reels or a matrix as described above, together with animation effects to simulate a spin of the game. A computer software program, which may reside in the video gaming machine, may randomly select one or more symbols in response to a spin, and may display the result on the display.

A modern slot machine may also be played over a computer network, such as by a player using a client machine (e.g., a general purpose personal computer) that is connected to a server machine over the computer network. In this instance, the server machine may perform the spins of the game and may send the resulting symbols to the client machine for display.

SUMMARY

Viewed from one aspect, the disclosure provides a gaming machine for playing a wager game in which symbol sets are displayed by the machine and the machine determines whether a player has won in dependence on the displayed symbol set, the gaming machine including means for selecting the symbol sets and means for displaying the symbol sets;

the machine being configured to select a first symbol set from a global symbol group and to display the first symbol set, wherein the first symbol set includes at least two symbols; characterised in that the machine is configured to carry out the following steps: determine that a trigger event has occurred; responsive to determining that the trigger event has occurred, identify at least one symbol in the first symbol set that is in a replaceable symbol group which is a subset of the global symbol group; for the or each symbol in the first symbol set which is in the replaceable symbol group, select a replacement symbol that is in the global symbol group; and display a second symbol set including (i) the symbols in the first symbol set which are not in the replaceable symbol group, and (ii) the or each replacement symbol.

There may be a plurality of symbols in the first symbol set that are in the replaceable symbol group. Each symbol in the first symbol set that is in the replaceable symbol group may be replaced by the same replacement symbol. Alternatively, symbols in the first symbol set that are in the replaceable symbol group may be replaced by different respective replacement symbols.

In some embodiments, the or each replaceable symbol is predetermined. In some embodiments, the or each replaceable symbol is selected from the replaceable symbol group responsive to determining that the trigger event has occurred.

In some embodiments, the machine is further configured to carry out the following steps: receiving a user request, via a user interface, to display a set of symbols; and responsive to receiving the user request, selecting the first symbol set from the global symbol group; and wherein determining that the trigger event has occurred involves determining that the first symbol set includes a trigger symbol.

In some embodiments, the global symbol group includes at least two trigger symbols.

In some embodiments, the machine is further configured to carry out the following step: for any symbol included in the first symbol set which is in the replaceable symbol group, displaying an indication that that symbol is a replaceable symbol.

Displaying the indication that a symbol is a replaceable symbol, may involve highlighting the symbol.

In some embodiments, the first symbol set includes multiple sub sets and the global symbol group includes multiple sub groups, each sub group corresponding to one of the sub sets, and wherein selecting the first symbol set from the global symbol group involves selecting each sub set from the corresponding sub group.

The first symbol set may be displayed in a column and row arrangement.

In some embodiments, the symbols of the first symbol set are displayed on a row across a plurality of reels each containing the symbols of the global symbol group.

In embodiments of an arrangement including sub-sets, the first symbol set may be displayed in a column and row arrangement and each sub set may be displayed in a corresponding column. In some embodiments, each symbol in the first symbol set is associated with an arrangement position in the column and row arrangement, and wherein displaying the first symbol set in the column and row arrangement involves displaying each symbol in the first symbol set according to the corresponding arrangement position. Displaying the first symbol set involves superimposing each sub set over a corresponding reel.

By way of example, the first symbol set may include fifteen symbols, and the column and row arrangement includes five columns and three rows.

In some embodiments, the gaming machine includes data processing means and data storage which for each symbol in the global symbol group stores an identifier and an associated displayable image, and wherein displaying the first symbol set involves displaying the displayable image associated with each symbol in the first symbol set.

In some embodiments, the machine includes a payout table and the machine is configured to carry out the following steps: receiving a first wager via a user interface before selecting the first symbol set; determining, using the stored payout table, a first payout amount, wherein the first payout amount is a function of the first symbol set and the received first wager; displaying the determined first payout amount; receiving a second wager via the user interface after selecting the first symbol set and before displaying the second symbol set; determining, using the payout table, a second payout amount, wherein the second payout amount is a function of the second symbol set and the second wager; and displaying the determined second payout amount.

In some embodiments, determining that a trigger event has occurred involves determining that the first symbol set includes a trigger symbol, and the machine is configured to carry out the step of displaying the selected replacement symbol superimposed over a reel that is superimposed over the displayed trigger symbol.

In some embodiments, each symbol in the global symbol group is associated with a respective number within a set of numbers, and wherein selecting the first symbol set from the global symbol group involves using a random number generator to select numbers from the set of numbers to select symbols associated with the selected numbers.

The gaming machine may be in the form of a stand alone gaming machine which incorporates a data processing module and a display. Alternatively, the gaming machine may include a gaming server and client which incorporates a data processing module and a display, the server and the client being remote from each other. The remote client may be in the form of a general purpose computer.

Viewed from a second aspect, the disclosure provides a method for playing a wager game in which symbol sets are displayed and determining whether a player has won is dependent on the displayed symbol set, the method including: selecting a first symbol set from a global symbol group and displaying the first symbol set, wherein the first symbol set includes at least two symbols; characterised by determining that a trigger event has occurred; responsive to determining that the trigger event has occurred, identifying at least one symbol in the first symbol set that is in a replaceable symbol group which is a subset of the global symbol group; for the or each symbol in the first symbol set which is in the replaceable symbol group, selecting a replacement symbol that is in the global symbol group; and displaying a second symbol set including (i) the symbols in the first symbol set which are not in the replaceable symbol group, and (ii) the or each replacement symbol.

Viewed from a third aspect, the disclosure provides a gaming server for use in playing a wager game in which symbol sets are displayed and determining whether a player has won is dependent on the displayed symbol set, the gaming server being configured to communicate with a client over a computer network, and the gaming server including a processor and a computer readable medium storing software instructions, that when executed by the processor, perform functions on the gaming server including selecting a first symbol set from a global symbol group, wherein the first symbol set includes at least two symbols and sending the first symbol set to the client, for the client to display; characterised in that the functions include: determining that a trigger event has occurred; responsive to determining that the trigger event has occurred, identifying at least one symbol in the first symbol set that is in a replaceable symbol group which is a subset of the global symbol group; for the or each symbol in the first symbol set which is in the replaceable symbol group, selecting a replacement symbol that is in the global symbol group; and sending to the client, for the client to display, a second symbol set including (i) the symbols in the first symbol set which are not in the replaceable symbol group, and (ii) the or each replacement symbol.

Viewed from a fourth aspect, the disclosure provides a data processing client for playing a wager game in which symbol sets are displayed and determining whether a player has won is dependent on the displayed symbol set, the data processing client being in communication with a gaming server and including: a display configured to display the symbol sets; a processor; and a computer readable medium storing software instructions, that when executed by the processor, perform functions on the data processing system, the functions including: receiving from the gaming server a first symbol set selected from a global symbol group, wherein the first symbol set includes at least two symbols; and displaying on the display the selected first symbol set; characterised by receiving from the gaming server, a second symbol set including (i) symbols in the first symbol set which are not in a replaceable symbol group, and (ii) a replacement symbol for the or each symbol in the first symbol set which is in a replaceable symbol group; and displaying on the display, the second symbol set.

Viewed from a fifth aspect, the disclosure provides a computer software product for configuring a data processing system for playing a wager game in which symbol sets are displayed and determining whether a player has won is dependent on the displayed symbol set, software product including instructions, that when executed by a processor of the data processing system will cause the data processing system to carry out the following functions: selecting a first symbol set from a global symbol group, wherein the first symbol set includes at least two symbols; and displaying the selected first symbol set; characterised in that the functions further include: determining that a trigger event has occurred; responsive to determining that the trigger event has occurred, identifying at least one symbol in the first symbol set that is in a replaceable symbol group which is a subset of the global symbol group; for the or each symbol in the first symbol set which is in the replaceable symbol group, selecting a replacement symbol that is in the global symbol group; and displaying a second symbol set including (i) the symbols in the first symbol set which are not in the replaceable symbol group, and (ii) the or each replacement symbol.

The features listed above as being features of embodiments of the first aspect of the disclosure, are equally applicable to embodiments of the second, third, fourth and fifth embodiments of the disclosure.

In embodiments of the disclosure in which a computer software product is used, the product may be non-transitory and store instructions on physical media such as a DVD, or a solid state drive, or a hard drive. Alternatively, the product may be transitory and in the form of instructions provided over a connection such as a network connection which is linked to a network such as the Internet.

Disclosed herein are machines and methods that relate to a symbol replacement feature in a wager game. In one aspect, a machine is disclosed that includes a display configured to display a symbol set in a wager game, a processor, and a non-transitory computer readable medium storing software instructions, that when executed by the processor, perform a set of functions. The set of functions includes (i) selecting a first symbol set from a global symbol group, wherein the first symbol set includes at least two symbols, (ii) displaying on the display the selected first symbol set, (iii) determining that a trigger event occurred, (iv) responsive to determining that the trigger event occurred, selecting a replaceable symbol from a replaceable symbol group, wherein the replaceable symbol group is a subset of the global symbol group, (v) selecting a replacement symbol from the global symbol group, and (vi) displaying on the display, a second symbol set, wherein the displayed second symbol set is identical to the displayed first symbol set, except that each selected replaceable symbol included in the selected first symbol set is replaced by the selected replacement symbol.

In another aspect, a server machine is disclosed. The server machine is configured to communicate with a client machine over a computer network, the client machine including a display configured to display a symbol set in a wager game. The server machine includes a processor and a non-transitory computer readable medium storing software instructions, that when executed by the processor, perform a set of functions. The set of functions includes: (i) selecting a first symbol set from a global symbol group, wherein the first symbol set includes at least two symbols, (ii) sending the selected first symbol set to the client machine to display on the display, (iii) determining that a trigger event occurred, (iv) responsive to determining that the trigger event occurred, selecting a replaceable symbol from a replaceable symbol group, wherein the replaceable symbol group is a subset of the global symbol group (v) sending the selected replaceable symbol to the client machine, (vi) selecting a replacement symbol from the global symbol group, and (vii) sending the selected replacement symbol to the client machine for displaying on the display a second symbol set, wherein the displayed second symbol set is identical to the displayed first symbol set, except that each selected replaceable symbol included in the displayed first symbol set is replaced by the selected replacement symbol.

In another aspect, a client machine is disclosed. The client machine is configured to communicate with a server machine over a computer network. The client machine includes a display configured to display a symbol set of a wager game, a processor, and a non-transitory computer readable medium storing software instructions, that when executed by the processor, perform a set of functions. The set of functions includes: (i) receiving from the server machine a first symbol set, wherein the first symbol set includes at least two symbols from a global symbol group, (ii) displaying on the display the received first symbol set, (iii) receiving from the server machine a replaceable symbol, wherein the replaceable symbol is from a replaceable symbol group, and wherein the replaceable symbol group is a subset of the global symbol group, and (iv) displaying on the display, a second symbol set, wherein the displayed second symbol set is identical to the displayed first symbol set, except that each received replaceable symbol included in the displayed first symbol set is replaced by the received replacement symbol.

In another aspect, a method for use with a display configured to display a symbol set in a wager game is disclosed. The method involves: (i) selecting, using a processor, a first symbol set from a global symbol group, wherein the first symbol set includes at least two symbols, (ii) displaying on the display the selected first symbol set; (iii) determining that a trigger event occurred (iv) responsive to determining that the trigger event occurred, selecting a replaceable symbol from a replaceable symbol group, wherein the replaceable symbol group is a subset of the global symbol group, (v) selecting a replacement symbol from the global symbol group, and (vi) displaying on the display, a second symbol set, wherein the displayed second symbol set is identical to the displayed first symbol set, except that each selected replaceable symbol included in the selected first symbol set is replaced by the selected replacement symbol.

BRIEF DESCRIPTION OF THE DRAWINGS

Some embodiments of the disclosure will now be described by way of example and with reference to the accompanying drawings, in which.

DETAILED DESCRIPTION

Throughout this disclosure, any reference to "a" or "an" refers to "at least one," and any reference to "the" refers to "the at least one," unless otherwise specified, or unless the context clearly dictates otherwise.

Disclosed herein are machines and methods that relate to a symbol replacement feature of a wager game. The symbol replacement feature may enhance traditional wager games (e.g., slot machines or other reel-type games) by providing a player with additional opportunities to win the game, thereby increasing the player's interest, anticipation, and excitement in connection with the game. This may in turn benefit a casino or another entity that provides a game with this feature. Indeed, wager games are typically configured to have odds that favor the casino (sometimes referred to as the "house"). Accordingly, based on the law of averages, casinos often maximize their profits simply by getting more players to play more games. Due to the symbol replacement feature, players may be drawn in (e.g., from competing casinos that lack games with such a feature) and they may play the game often.

In one aspect, a player may play a reel type wager game and cause a symbol set to be randomly selected. The symbol set may then be analyzed to determine whether the player receives a first payout. Further, in response to the symbol set including a trigger symbol, one or more replaceable symbols in the symbol set may be replaced by a replacement symbol. Then, the resulting modified symbol set may be analyzed to determine whether the player receives a second payout.

Figure 1:
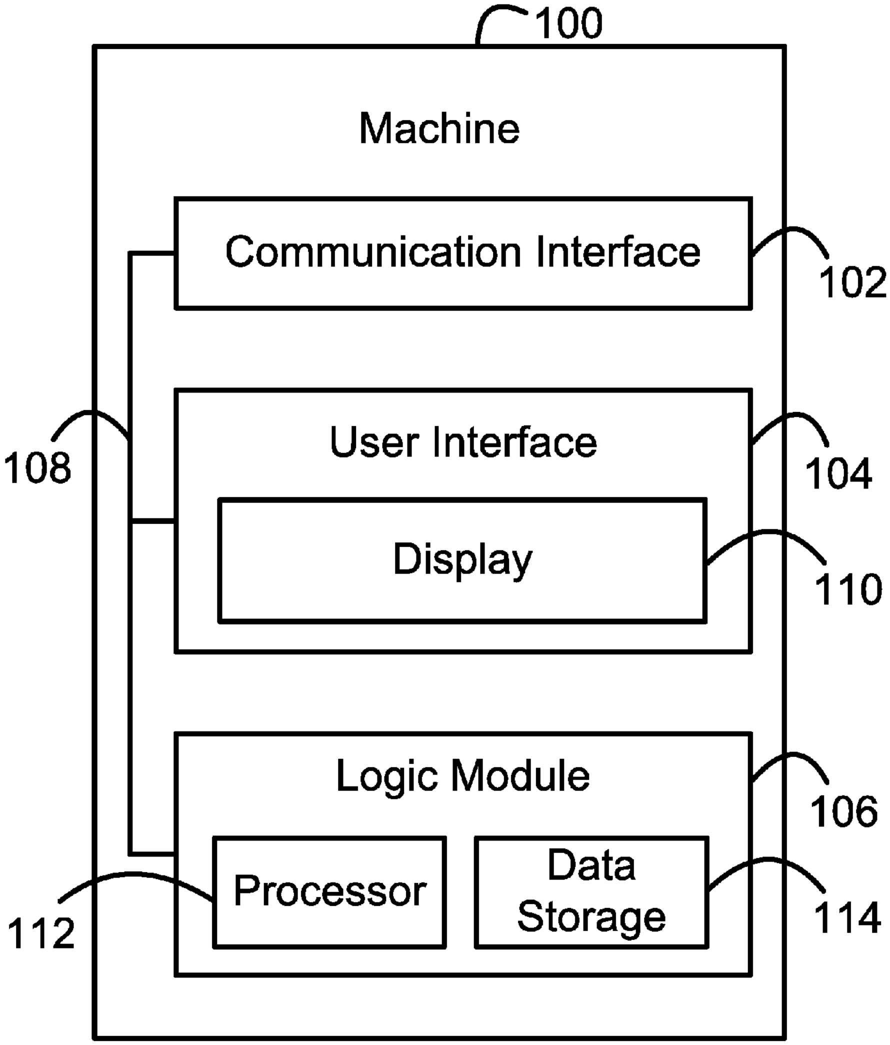
FIG. 1 is a simplified block diagram of an embodiment of a machine in accordance with the disclosure.

FIG. 1 shows a simplified block diagram of an example machine 100 arranged to implement functions in accordance with example methods described herein. The machine 100 may take any of a variety of forms, including for example a dedicated gaming machine, personal computer, personal digital assistant, mobile phone, tablet device, or other computing device.

The machine 100 may include a communication interface 102, a user interface 104, and a logic module 106, all of which may be coupled together by a system bus, network, or other connection mechanism 108. The communication interface 102 may include a wired or wireless network communication interface.

The user interface 104 may facilitate interaction with a user (e.g., a player of a wager game) if applicable. As such, the user interface 104 may take the form of a GUI and may include output components such as a speaker and a display 110, and input components such as a keypad or a touch sensitive screen. As described in greater detail below, the display 110 may be configured to display, among other things, a symbol set in a wager game.

The logic module 106 may take the form of a processor 112 and a data storage 114. The processor 114 may include a general purpose processor (e.g., a microprocessor) and/or a special purpose processor (e.g., a digital signal processor and/or application specific integrated circuit) and may be integrated in whole or in part with the communication interface 102 and/or the user interface 104.

The data storage 114 may include volatile and/or non-volatile storage components and may be integrated in whole or in part with the processor 112. The data storage 114 may take the form of a non-transitory computer readable medium and may contain software instructions, that when executed by the processor 114, cause the machine 100 to perform one or more of the functions described herein.

The data storage 114 may also include operating system software on which the machine 100 may operate. For example, the machine 100 may operate on a Windows based operating system (e.g., Windows XP or Windows NT) provided by the Microsoft Corporation of Redmond, Wash.

Figure 2:
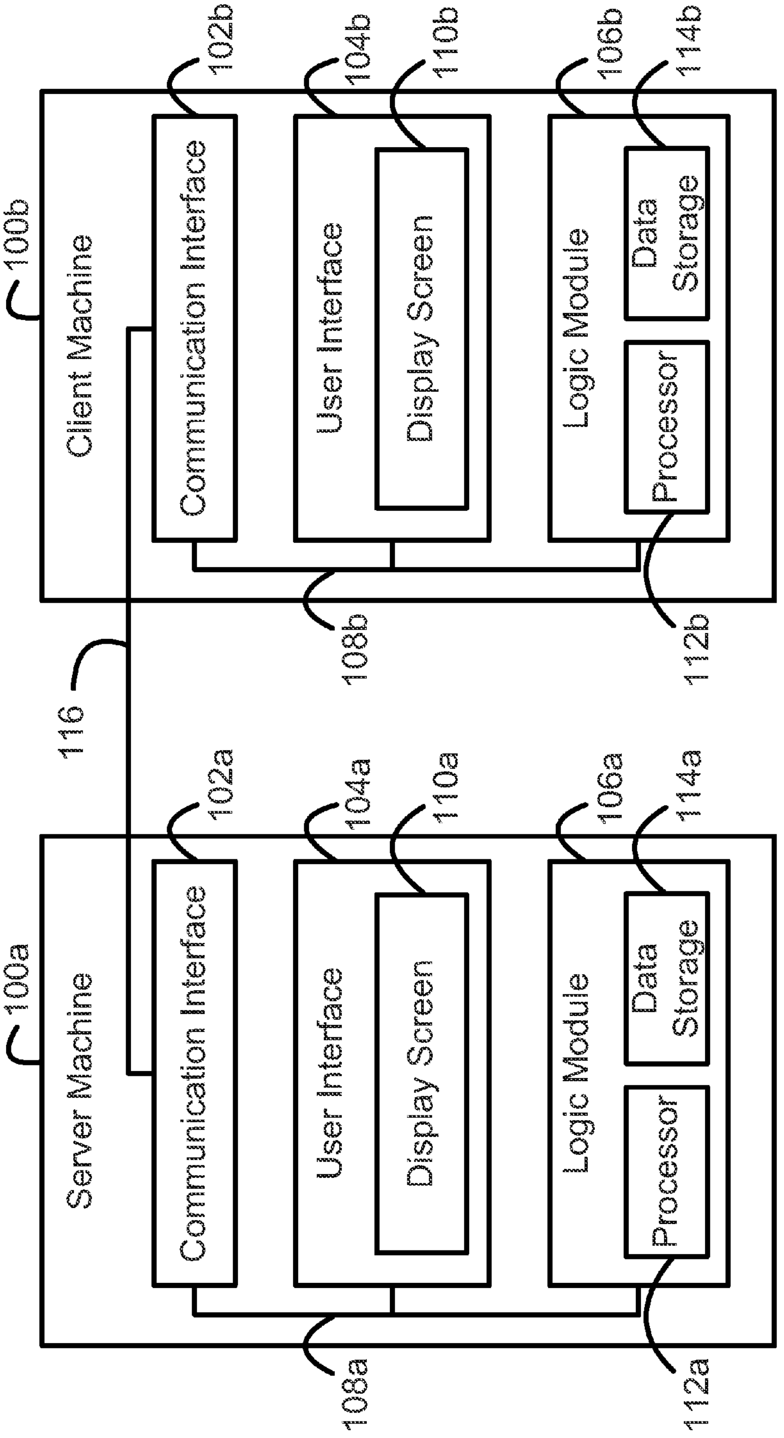
FIG. 2 is a simplified block diagram of an example server machine connected to an example client machine over a computer network, in an embodiment of the disclosure.

FIG. 2 is a simplified block diagram of an example server machine 100*a* connected to an example client machine (sometimes referred to as a workstation) 100*b* over a computer network 116. The components of the server machine 100*a* and the client machine 100*b* are shown with corresponding "a" and ""b" reference numerals (i.e., based on the machine 100). The server machine 100*a* is configured to communicate with the client machine 100*b* over the computer network 116 (via the communication interfaces 102*a*, 102*b*). Likewise, the client machine 100*b* is configured to communicate with the server machine 100*a* over the computer network 116. In such server client based configurations, the server machine 100*a* and/or the client machine 100*b* may perform one or more of the functions described herein.

The computer network based server client configuration described above may take a variety of forms. For example, the computer network 116 may be a local area network (LAN) in a casino, such that client machines 100*b* dispersed throughout the casino may communicate with the server machine 100*a* in the casino.

In another example, the computer network 116 may be a wide area network (WAN), such as an Internet network. In such a configuration, the client machines 100*b* may communicate with the server machine 100*a* via a website portal (for a virtual casino) hosted on the server machine 100*a.*

The computer network 116 may include any of a variety of network topologies and network devices, and may employ traditional network related technologies, including for example the public switched telephone network, cable networks, cellular wireless networks, WiFi, and WiMax. Further, the computer network may include one or more databases (e.g., a player credit account database), to allow for the storing and retrieving of data related to the wager game.

Figure 3A:
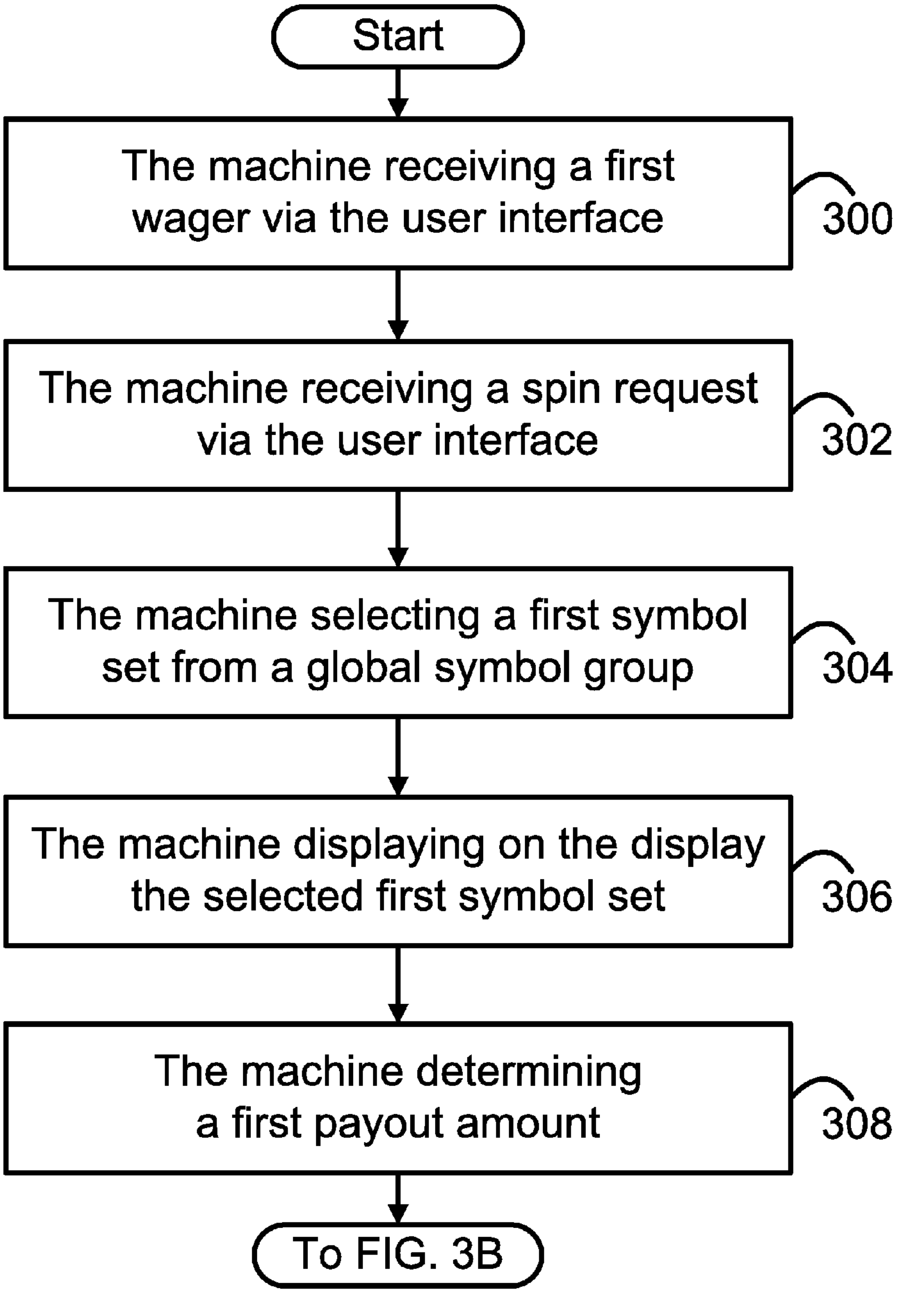
FIG. 3 A is a first part of a flow chart showing functions in accordance with a method in an embodiment of the disclosure.
FIG. 3B is a second part of the flow chart of FIG. 3A.
FIG. 3C is a third part of the flow chart of FIG. 3A.
Figure 3B:
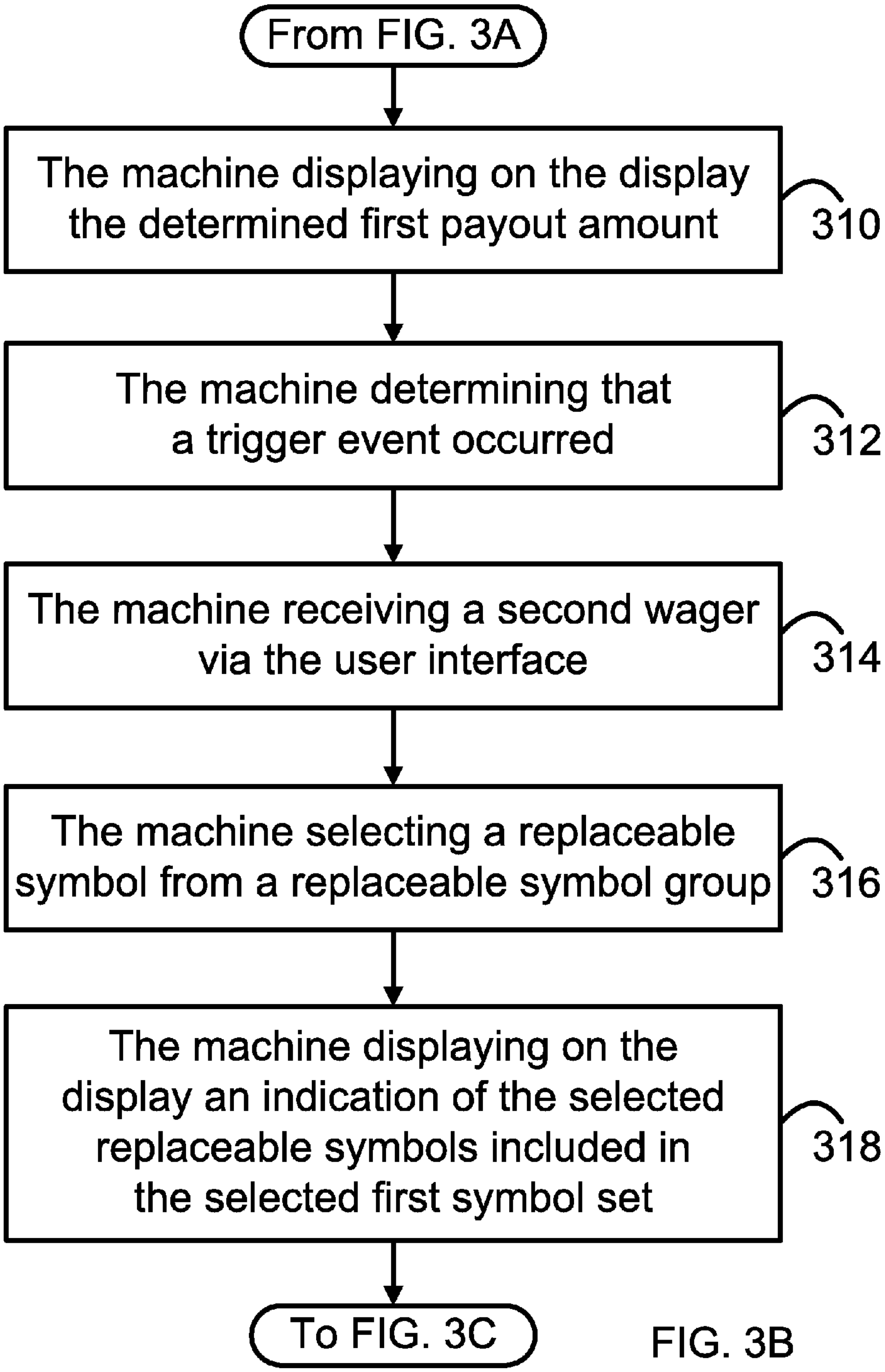
Figure 3C:
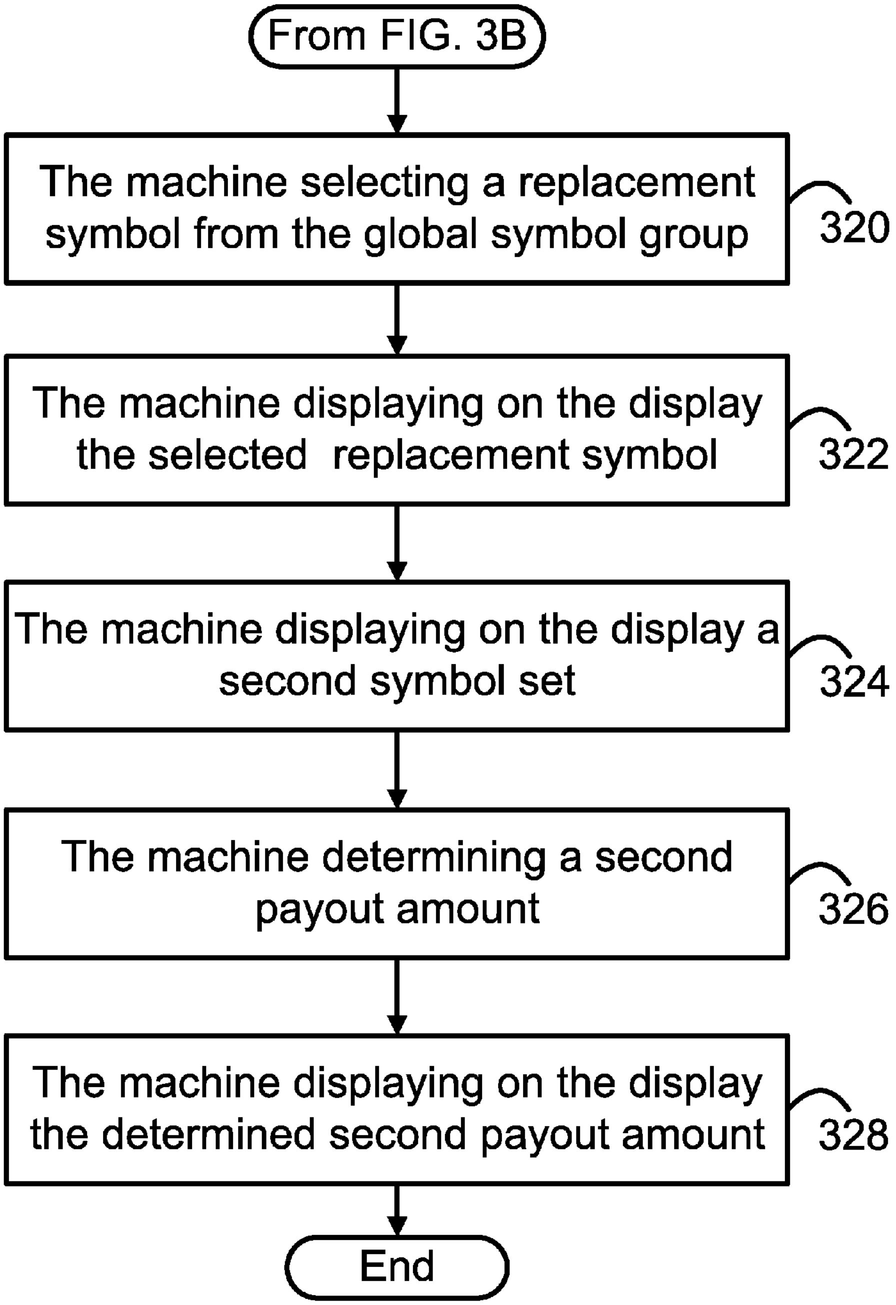

FIGS. 3A-3C show a flow chart showing functions in accordance with an example method in connection with the machine 100. The example method relates to a wager game.

At block 300, the method may involve the machine 100 receiving a first wager via the user interface 104. In one example, this may allow a player to enter a first wager of the wager game on a keypad on the machine 100. At block 302, the method may involve the machine 100 receiving a spin request (or other type of game start request) via the user interface 104. In one example, this may allow a player to pull a level or push a button on the machine 100 to request a spin of the wager game.

At block 304, the method may involve the machine 100 selecting a first symbol set from a global symbol group. In one example, the machine 100 selects the first symbol set responsive to the machine 100 receiving the spin request.

Figure 4:
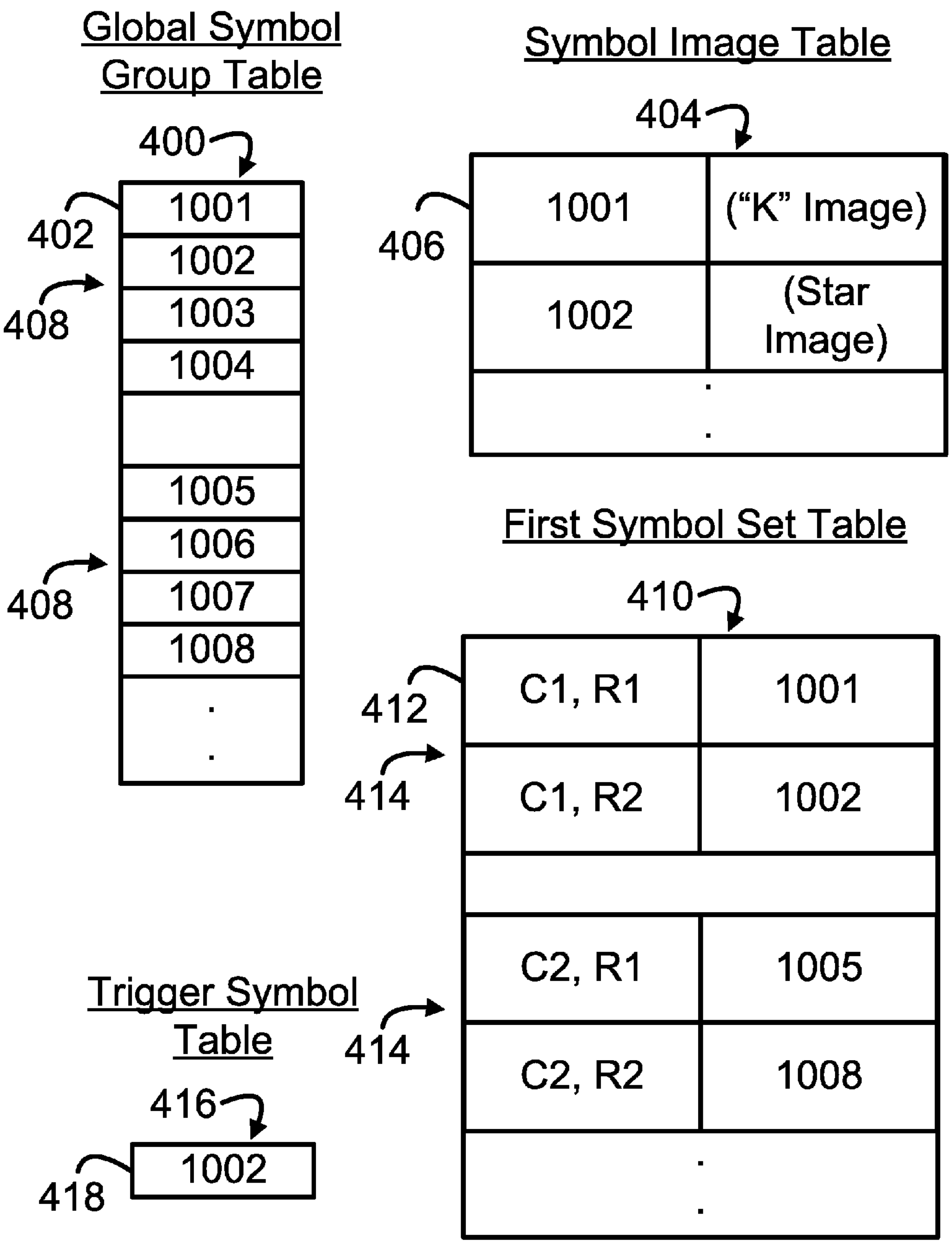
FIG. 4 includes diagrams of tables used in accordance with machines and methods in embodiments of the disclosure.

The global symbol group includes multiple symbols, such as a star, a heart, a sun, or a "K" (for a King), that may be used in connection with the wager game. The global symbol group may be customized with particular symbols as desired. In one example, the global symbol group may be represented as a table (or other data structure) stored in the data storage 114. FIG. 4 shows an example global symbol group table 400. The global symbol group table 400 includes multiple records 402, each including an identifier that represents a particular symbol. In one example, the global symbol group, and therefore the global symbol table 400, may be divided into multiple sub groups 408 as discussed in greater detail below.

The global symbol group table 400 may be used in connection with a symbol image table 404. The symbol image table 404 includes multiple records 406, each including an identifier that represents a particular symbol, and a corresponding displayable image. As such, the symbol image table 404 may be used to map an identifier in the global symbol group table 400 to a displayable image.

The selected symbol set may also be represented by a table 410. The table 410 includes multiple records 412, each including an arrangement position of the symbol, and an identifier the represents the symbol. As such, each symbol in the first symbol set may be associated with an arrangement position, such as a column and row number in a column and row arrangement.

In one example, the machine 100 may select the first symbol set by iterating though each record 412 in the first symbol set table 410, and select a symbol identifier from among the symbol identifiers in the global symbol group table 400. In one example, the symbol identifiers are numbers and the machine 100 uses a random number generator to select such numbers, and therefore randomly select symbols.

In one example, the machine 100 may select each sub set in the symbol set from the corresponding sub group in the global symbol group. This type of selection may be used when the symbol set represents one or more reels in a reel type wager game. In this instance, each sub group includes all the symbols of a given reel, and the selected sub set includes the symbols of the reel that are "in play," namely those included in the selected first symbol set.

Returning to FIGS. 3A-3C, at block 306, the method may involve the machine 100 displaying on the display 110 the selected first symbol set. In one example, the machine 100 may display a first symbol set on the display 110 by displaying the displayable image associated with each symbol in the selected first symbol set (e.g., according to the symbol image table 404).

In one example, the machine 100 may display the first symbol set in a column and row arrangement by displaying each symbol in the selected first symbol set according to the corresponding arrangement position. Further, where the column and row arrangement is used to simulate reels, the machine 100 may display the each sub set in a corresponding column, such as by superimposing each sub set over a virtual reel in a corresponding column.

Figure 5:
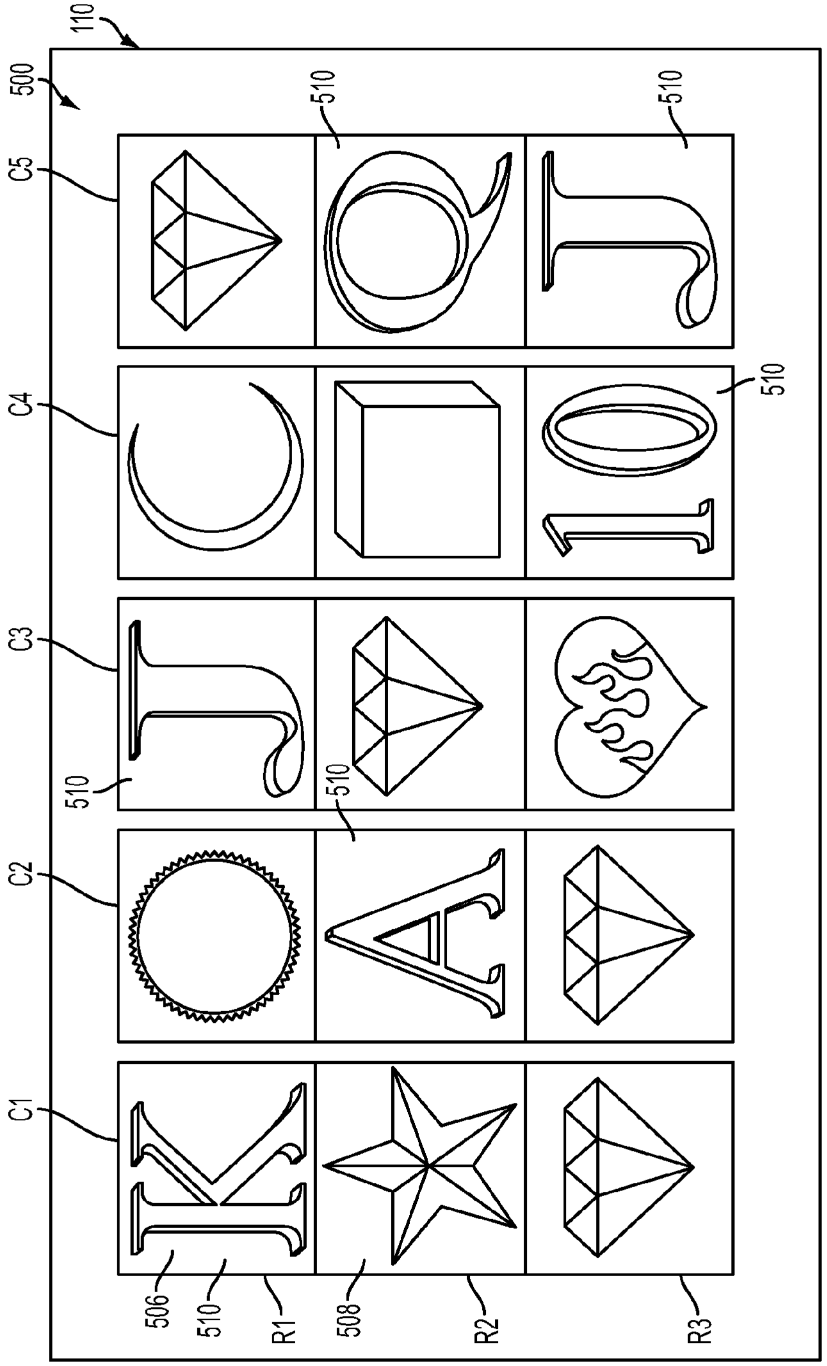
FIG. 5 depicts a display displaying a first symbol set in accordance with an embodiment of a machine and method in accordance with the disclosure.

FIG. 5 shows an example of a first symbol set 500 displayed on the display 110. The first symbol set 500 has an arrangement of five columns C1-C5 and three rows R1-R3, and includes a total of fifteen symbols 506.

Returning to FIGS. 3A-3C, at block 308, the method may involve the machine 100 determining, using a stored payout table (not shown), a first payout amount, where the first payout amount is a function of the selected first symbol set and the received first wager. In one example, the stored payout table may map a given symbol set (or template conditions) to a payout multiplier. As such, the received first wager may be multiplied by the appropriate payout multiplier to determine the first payout amount.

At block 310, the method may involve the machine 100 displaying on the display 110 the determined first payout amount. In one example, the machine 100 may also physically dispense a corresponding payout (e.g., cash), or otherwise facilitate the payout to the player (by adding funds to an electronic account associated with a gaming card).

At block 312, the method may involve the machine 100 determining that a trigger event occurred. The trigger event may be used to trigger one or more functions related to the symbol replacement feature of the wager game. In one example, the machine 100 may determine that the trigger event occurred by determining that the selected first symbol set includes a trigger symbol. A trigger symbol may be a predetermined symbol from the global symbol group. In one example, the trigger symbol is represented in a trigger symbol table. FIG. 4 shows an example trigger symbol table 416, which includes a record 418 that includes an identifier representing the trigger symbol. In the example, shown in FIG. 4, the trigger symbol is a star (i.e., it maps to the star image based on the symbol image table 404), although other symbols may also be trigger symbols. In an example where the trigger symbol is a star, FIG. 5 shows the first symbol set 500 including a trigger symbol 508 (at the position C1, R2).

In one example, the machine 100 may determine that the trigger event occurred by determining that selected first symbol set includes the selected trigger symbol in one or more particular arrangement positions (e.g., in a middle row or a middle column). In some instances, the machine 100 may determine that the trigger event occurred by determining that selected first symbol set includes two or more (of the same or different) trigger symbols, and potentially in one or more particular positions.

At block 314, the method may involve the machine 100 receiving a second wager via the user interface 104. Similar to the first wager, this may allow a player to enter a second wager of the wager game on a keypad on the machine 100.

At block 316, the method may involve the machine 100 selecting a replaceable symbol from a replaceable symbol group. In one example, the machine may select the replaceable symbol responsive to the machine 100 determining that the trigger event occurred. The replaceable symbol group may be a subset of the global symbol group. In one example, the replaceable symbol may include two or more replaceable symbols. Similar to the selection of the first symbol group, in one example, the machine 100 may use a random number generator to select the replaceable symbol group from the global symbol group. In another example, the replaceable symbol group may be non-randomly selected, such as selected by a user (e.g., a player, machine designer, or casino personnel). In another example, the replaceable symbols may be predetermined.

In an example where there are multiple replaceable symbols and they include so called "royalty" symbols (defined as "A," "K," "Q," "J," and "10," based on the respective Ace, King, Queen, Jack, and Ten playing cards), FIG. 5 shows six occurrence of selected replaceable symbols 510 in the first symbol set 500 (at the positions C1, R1; C2, R2; C3, R1; C4, R3; C5, R2; and C5, R3).

Figure 6:
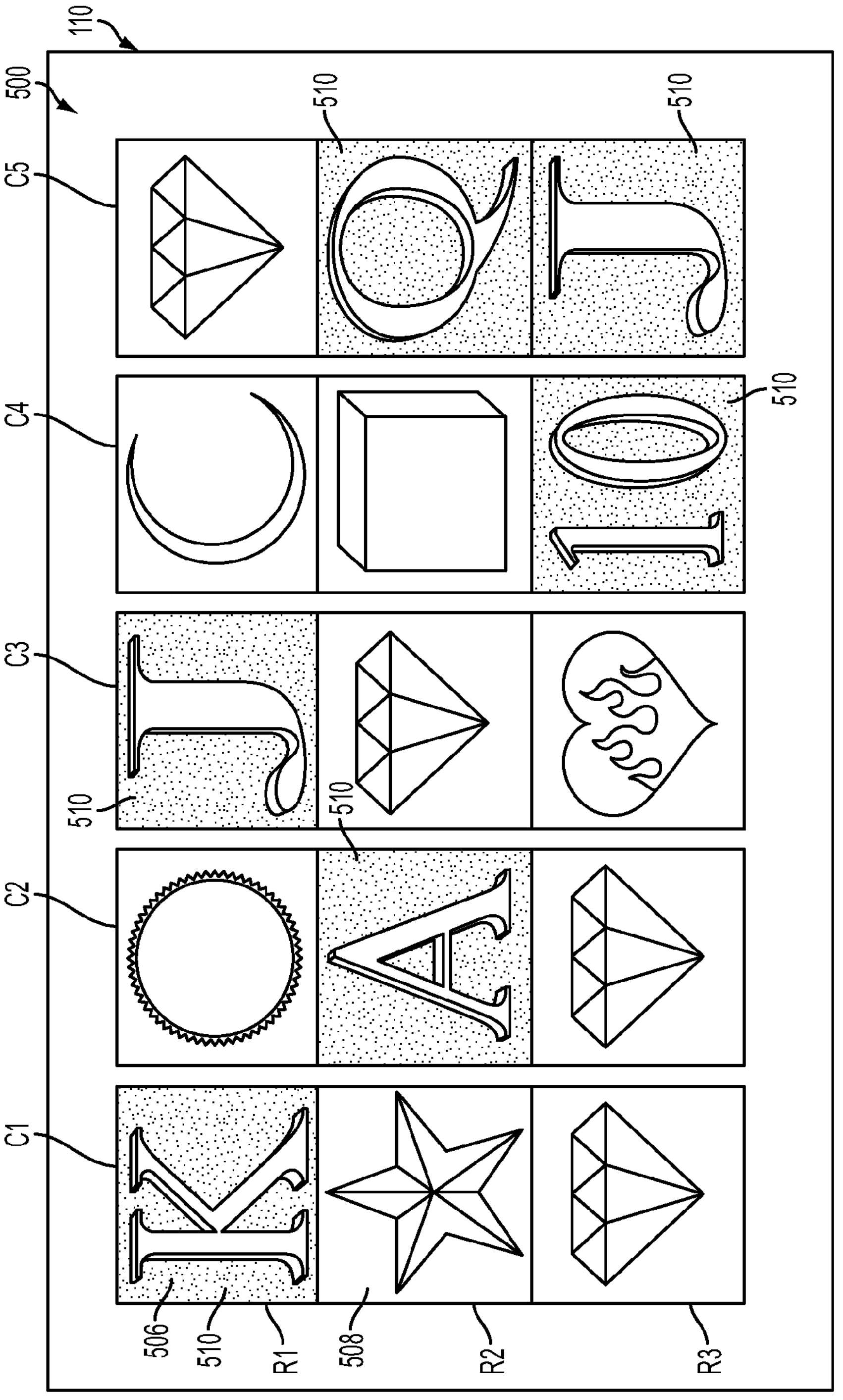
FIG. 6 depicts the display of FIG. 5, further displaying an indication of multiple replaceable symbols in accordance with an embodiment machine and method in accordance with the disclosure.

At block 318, the method may involve the machine 100 displaying on the display 110 an indication of the selected replaceable symbol included in the selected first symbol set. As shown in FIG. 6, in one example the machine 100 may display such an indication by highlighting, shading, hatching, or adding a border around the corresponding selected replaceable symbols, but other indication techniques may also be used.

Figure 7:
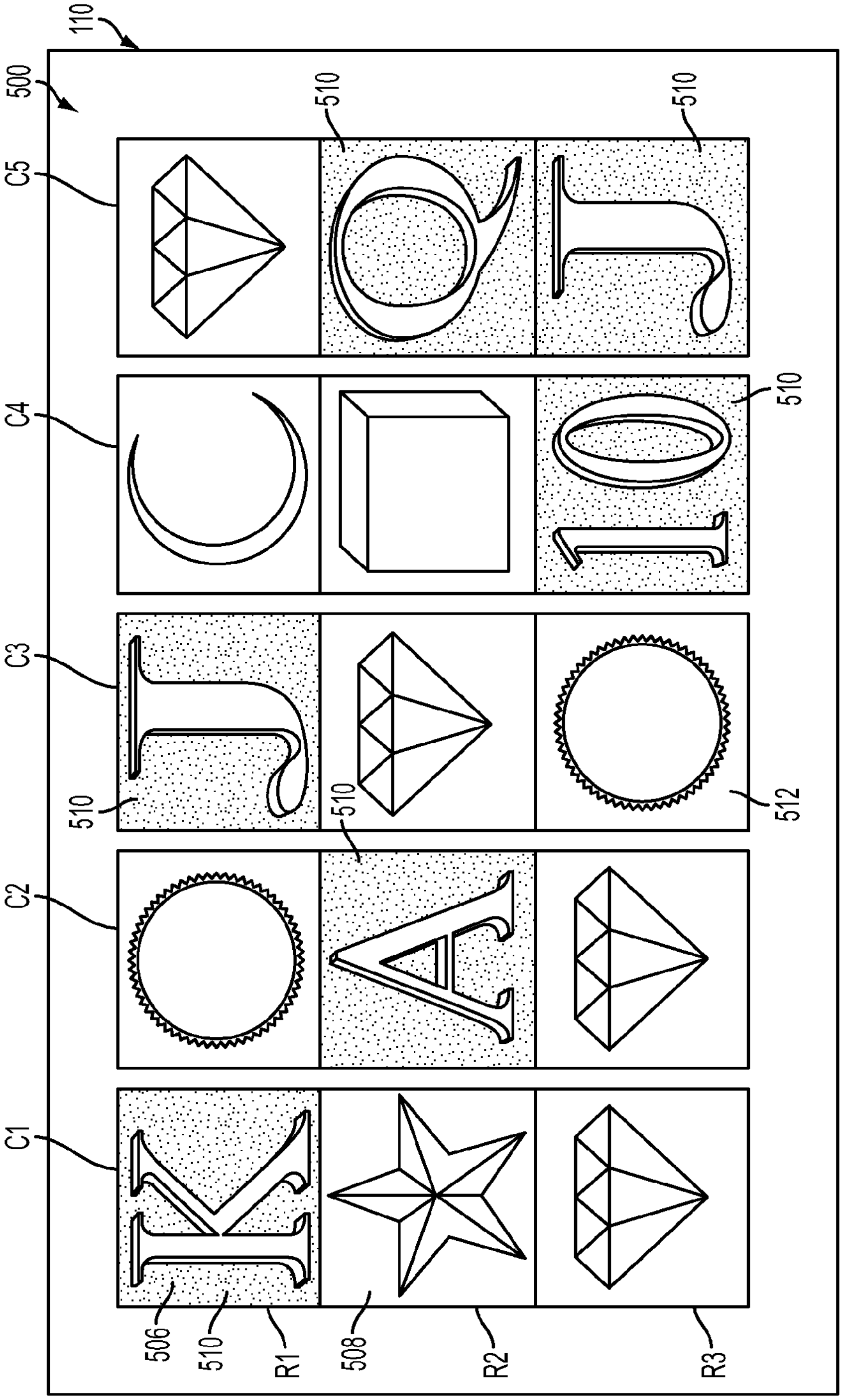
FIG. 7 depicts the display of FIG. 6, further displaying a selected replacement symbol in accordance with an embodiment of a machine and method in accordance with the disclosure.

At block 320, the method may involve the machine 100 selecting a replacement symbol from the global symbol group. Again, the machine 100 may use a random number generator to select the replacement symbol. At block 322, the method may involve the machine 100 displaying on the display 110 the selected replacement symbol. In one example, the machine 100 may display the replacement symbol 314 superimposed over another symbol in the first symbol set. In one example where the replacement symbol is a sun, as shown in FIG. 7, a selected replacement symbol 512 is superimposed over the heart symbol at position C3, R3. However, the selected replacement symbol may be superimposed over any symbol in the first symbol set, including for example the trigger symbol. Further, in one example, a mini reel may be superimposed on the display (e.g., over a symbol in the first symbol set), and animation effects may be used to simulate the mini reel spinning and resting with the replacement symbol being displayed.

At block 324, the method may involve the machine 100 displaying on the display 110, a second symbol set. The displayed second symbol set is identical to the displayed first symbol set, except that each selected replaceable symbol included in the selected first symbol set is replaced by the selected replacement symbol.

Figure 8:
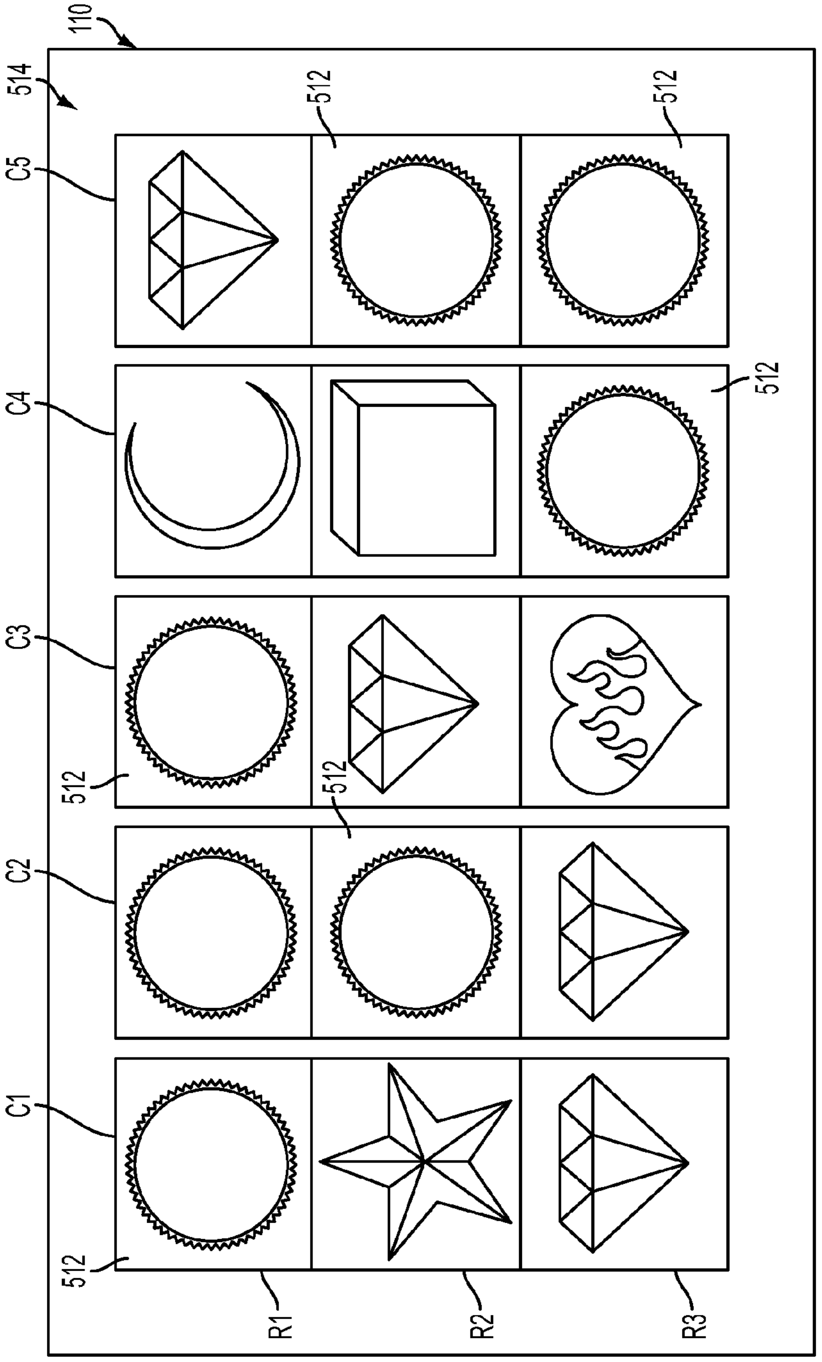
FIG. 8 depicts the display of FIG. 7, further displaying a second symbol set in accordance with an embodiments of a machine and method in accordance with the disclosure.

For example, as shown in the FIG. 8, a displayed second symbol set 514 is identical to the displayed first symbol set 500 (FIG. 5), except that each selected replaceable symbol included in the selected first symbol set is replaced by the selected replacement symbol. Accordingly, the second symbol set 514 has six occurrence of the selected replacement symbol 512 (at the positions C1, R1; C2, R2; C3, R1; C4, R3; C5, R2; and C5, R3).

At block 326, the method may involve the machine 100 determining, using the stored payout table a second payout amount. Similar to the first payout amount, the second payout amount is a function of the displayed second symbol set and the received second wager. Notably, in one example, a single wager (e.g., the received first wager) may be used to determine both the first and second payout amounts.

At block 328, the method may involve the machine 100 displaying on the display 110 the determined second payout amount. As with the first payout amount, the machine 100 may also physically dispense a corresponding payout (e.g., the determined second payout amount or a combination of the determined first and second payout amounts) or otherwise facilitate the payout to the player.

Figure 9A:
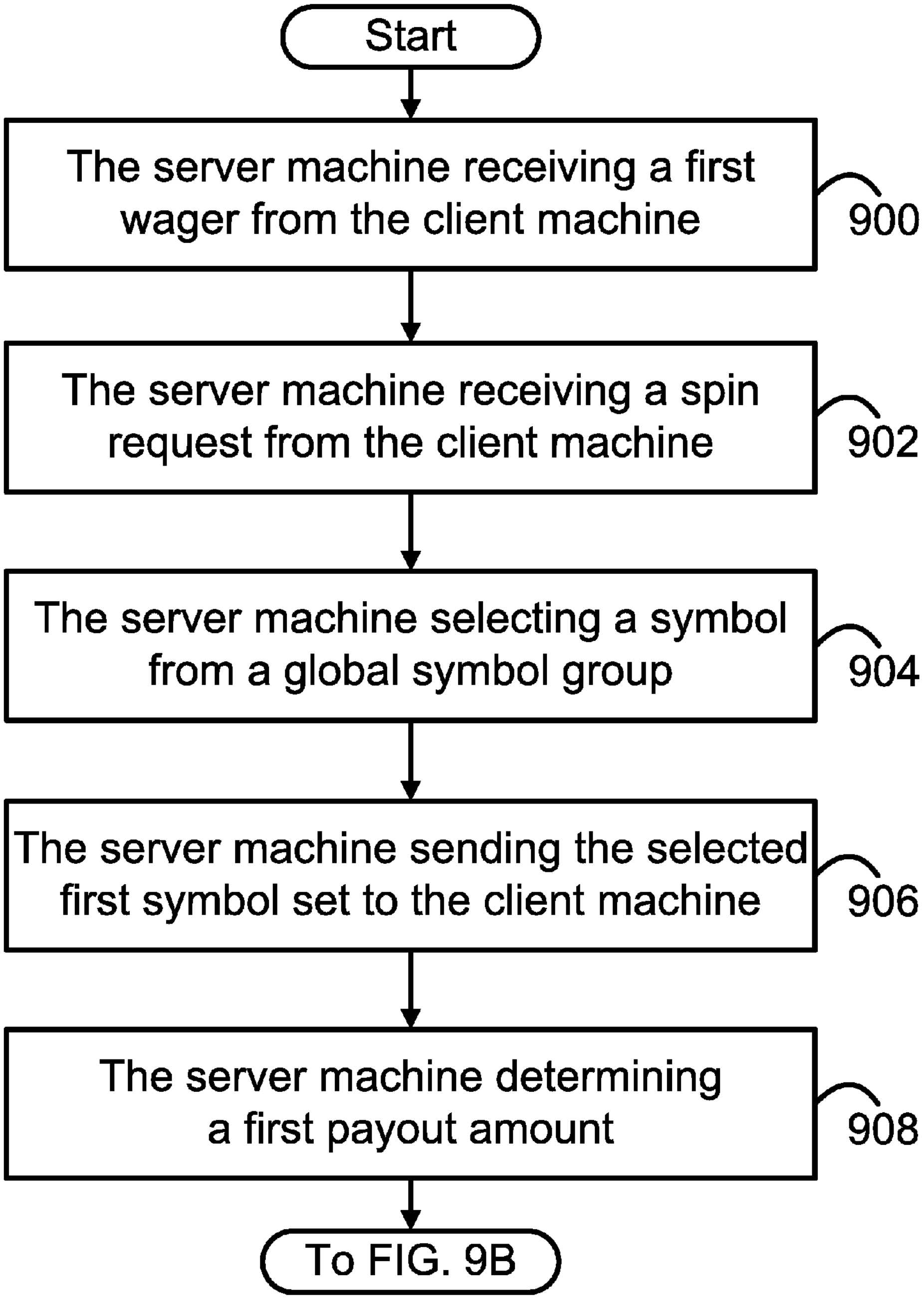
FIG. 9 A is a first part of a flow chart showing functions in accordance with an embodiment of a method in accordance with the disclosure, in connection with an example server machine.
FIG. 9B is a second part of the flow chart of FIG. 9A.
FIG. 9C is a third part of the flow chart of FIG. 9A.
Figure 9B:
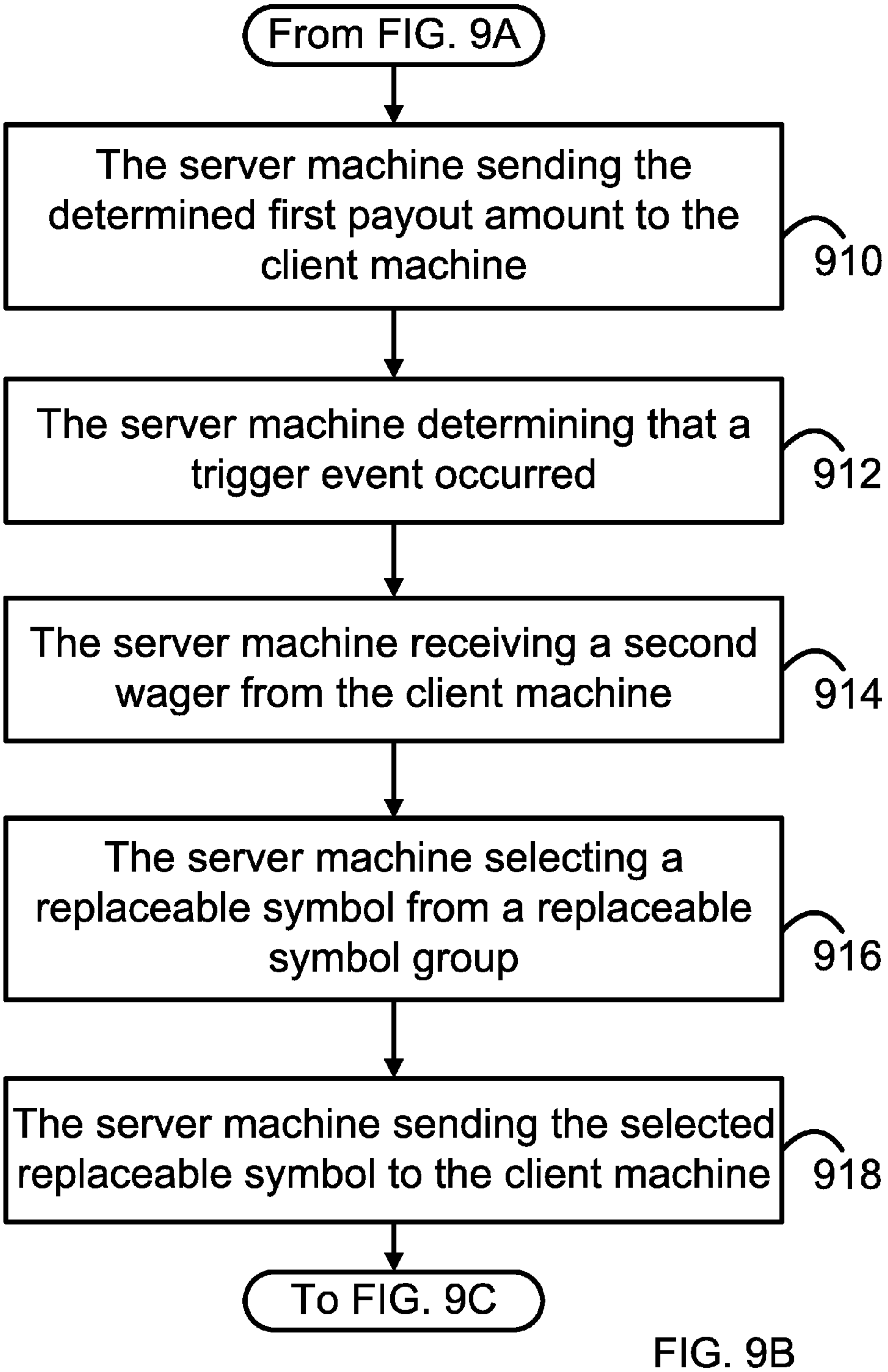
Figure 9C:
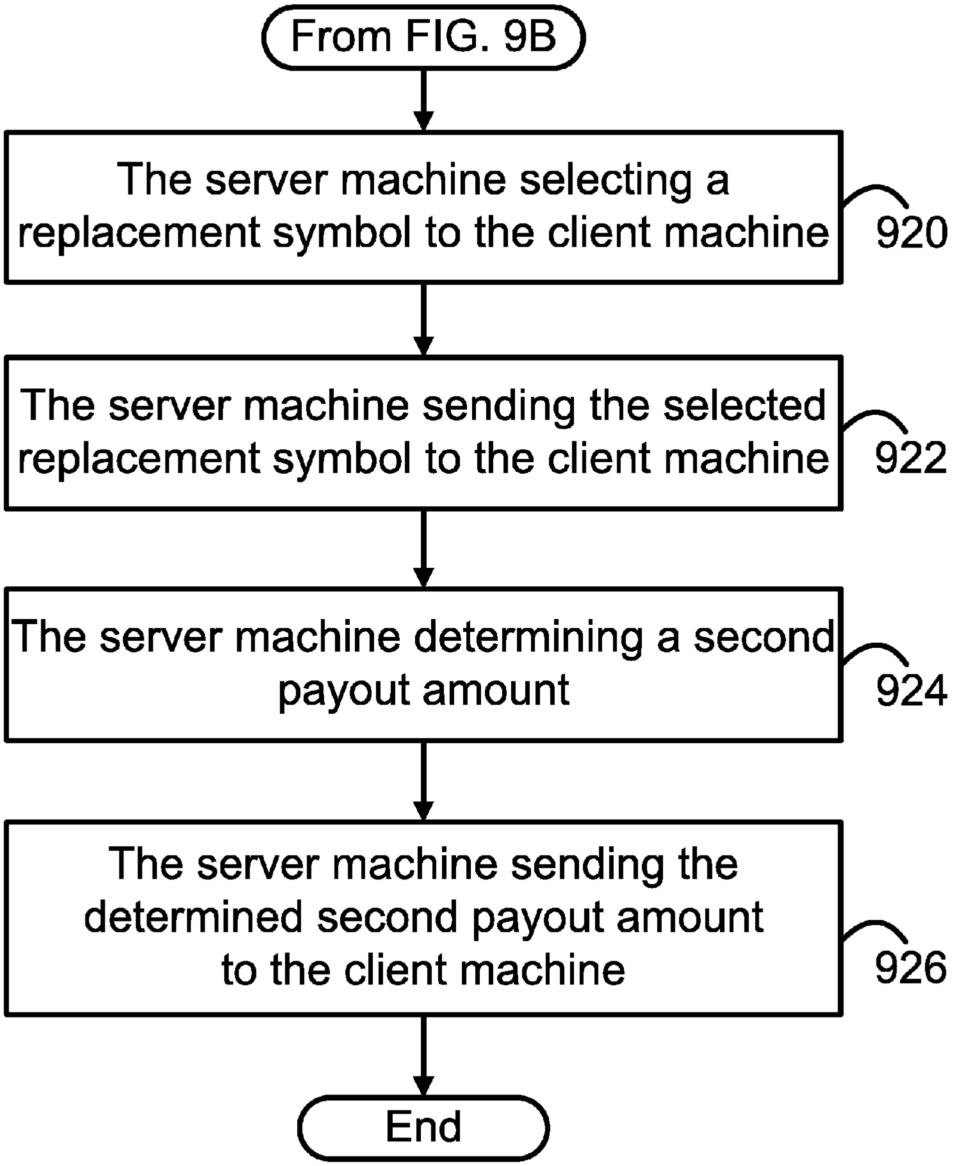

FIGS. 9A-9C) show a flow chart showing functions in accordance with an example method in connection with the server machine 100*a*. Note that several of the functions described in connection with FIGS. 9A-9C parallel functions described in connection with FIGS. 3A-9C. As such, variations of the functions described in connection with FIGS. 3A-3C are likewise applicable to the functions described in connection with FIGS. 9A-9C. However, for the sake of brevity, these variations are not repeated.

At block 900, the method may involve the server machine 100*a* receiving a first wager from the client machine 100*b*. At block 902, the method may involve the server machine 100*a* receiving a spin request from the client machine 100*b*.

At block 904, the method may involve the server machine 100*a* selecting a first symbol set from a global symbol group. At block 906, the method may involve the server machine 100*a* sending the selected first symbol set to the client machine 100*b* to display on the display. In one example, the server machine 100*a* may send a displayable image associated with each symbol in the selected first symbol set to the client machine 100*b*. In another example, the server machine 100*a* may send an identifier associated with each symbol in the selected first symbol set to the client machine 100*b*. In one example, the server machine 100*a* may also send an associated arrangement position of each symbol in the selected first symbol set to the client machine 100*b*. In another example, such arrangement positions may be implied by the order in which the identifiers are sent.

At block 908, the method may involve the server machine 100*a* determining, using a stored payout table, a first payout amount, where the first payout amount is a function of the selected first symbol set and the received first wager. At block 910, the method may involve the server machine 100*a* sending the determined first payout amount to the client machine 100*b* to display on the display 110*b*.

At block 912, the method may involve the server machine 100*a* determining that a trigger event occurred. At block 914, the method may involve the server machine 100*a* receiving a second wager from the client machine 100*b*. At block 916, the method may involve the server machine 100*a* selecting a replaceable symbol from a replaceable symbol group. At block 918, the method may involve the server machine 100*a* sending the selected replaceable symbol to the client machine 100*b*.

At block 920, the method may involve the server machine 100*a* selecting a replacement symbol from the global symbol group. At block 922, the method may involve the server machine 100*a* sending the selected replacement symbol to the client machine 100*b* for displaying on the display 100*b* a second symbol set, where the displayed second symbol set is identical to the displayed first symbol set, except that each selected replaceable symbol included in the displayed first symbol set is replaced by the selected replacement symbol.

At block 924, the method may involve the server machine 100*a* determining, using the stored payout table, a second payout amount, wherein the second payout amount is a function of the second symbol set and the received second wager. At block 926, the method may involve the server machine 100*a* sending the determined second payout amount to the client machine 100*b* for display on the display 110*b*.

Figure 10A:
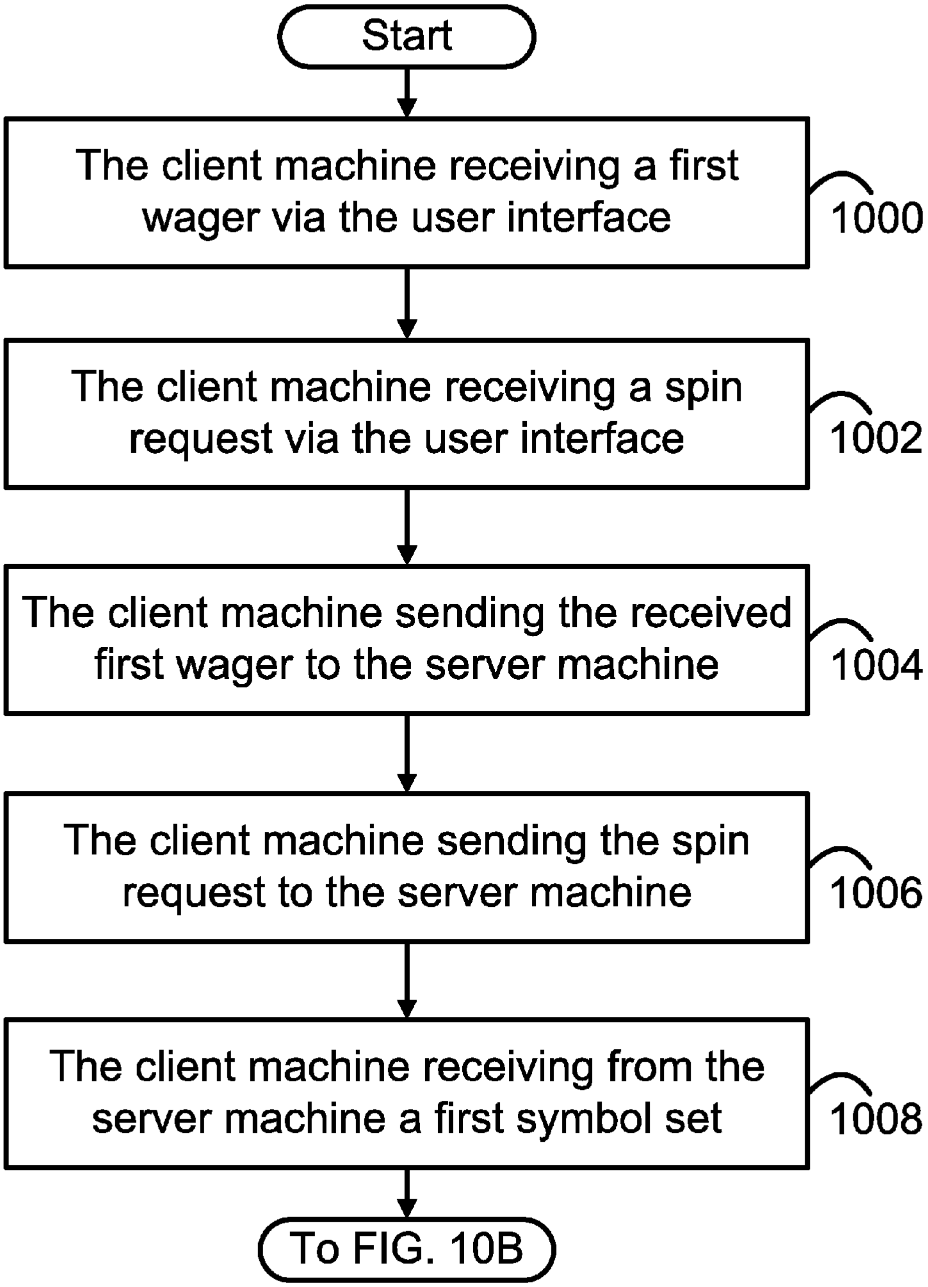
FIG. 10A is a first part of a flow chart showing functions in accordance with an embodiment of a method, in accordance with the disclosure, in connection with an embodiment of a client machine in accordance with the disclosure.
Figure 10B:
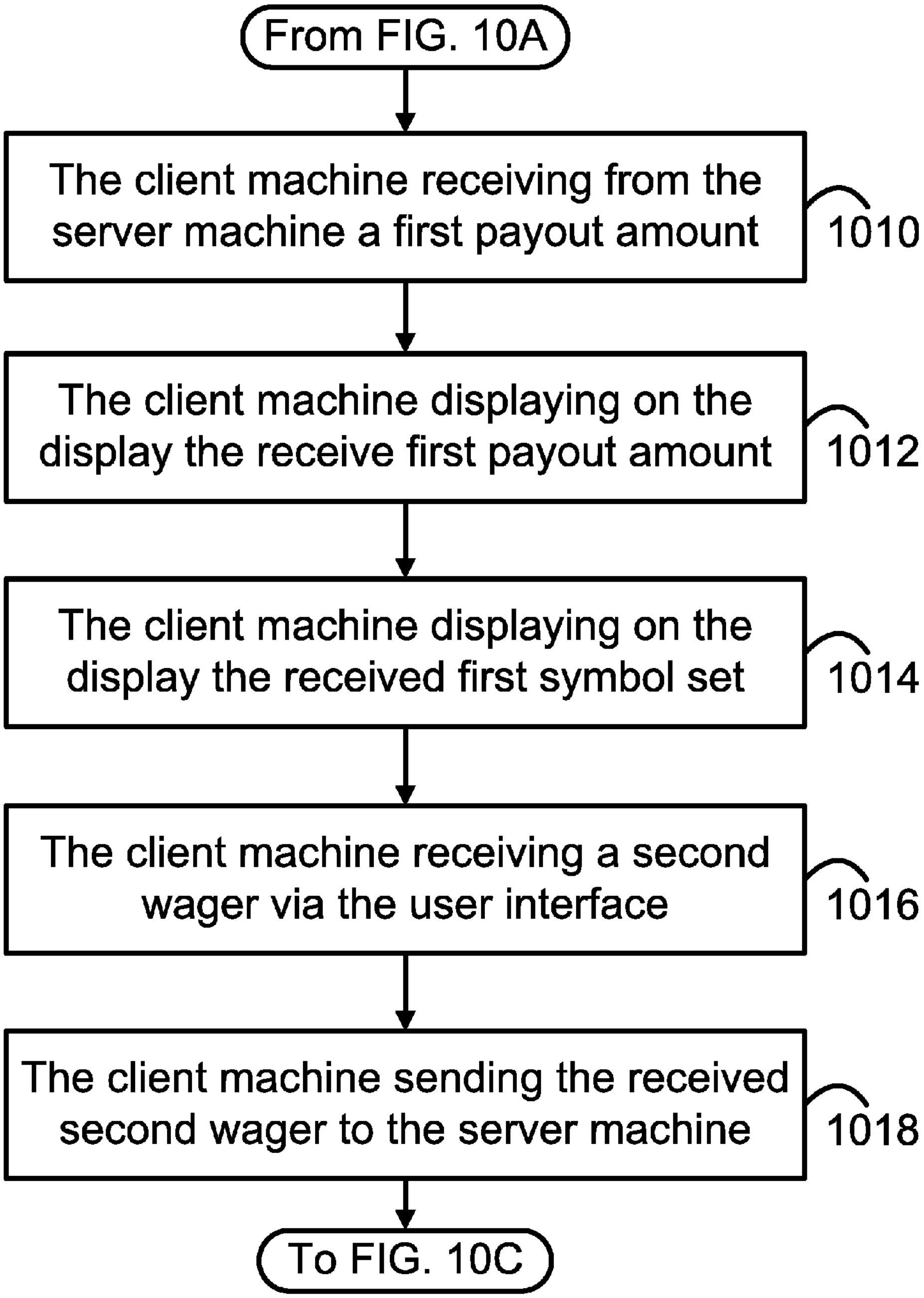
FIG. 10B is a second part of the flow chart of FIG. 10A.
Figure 10C:
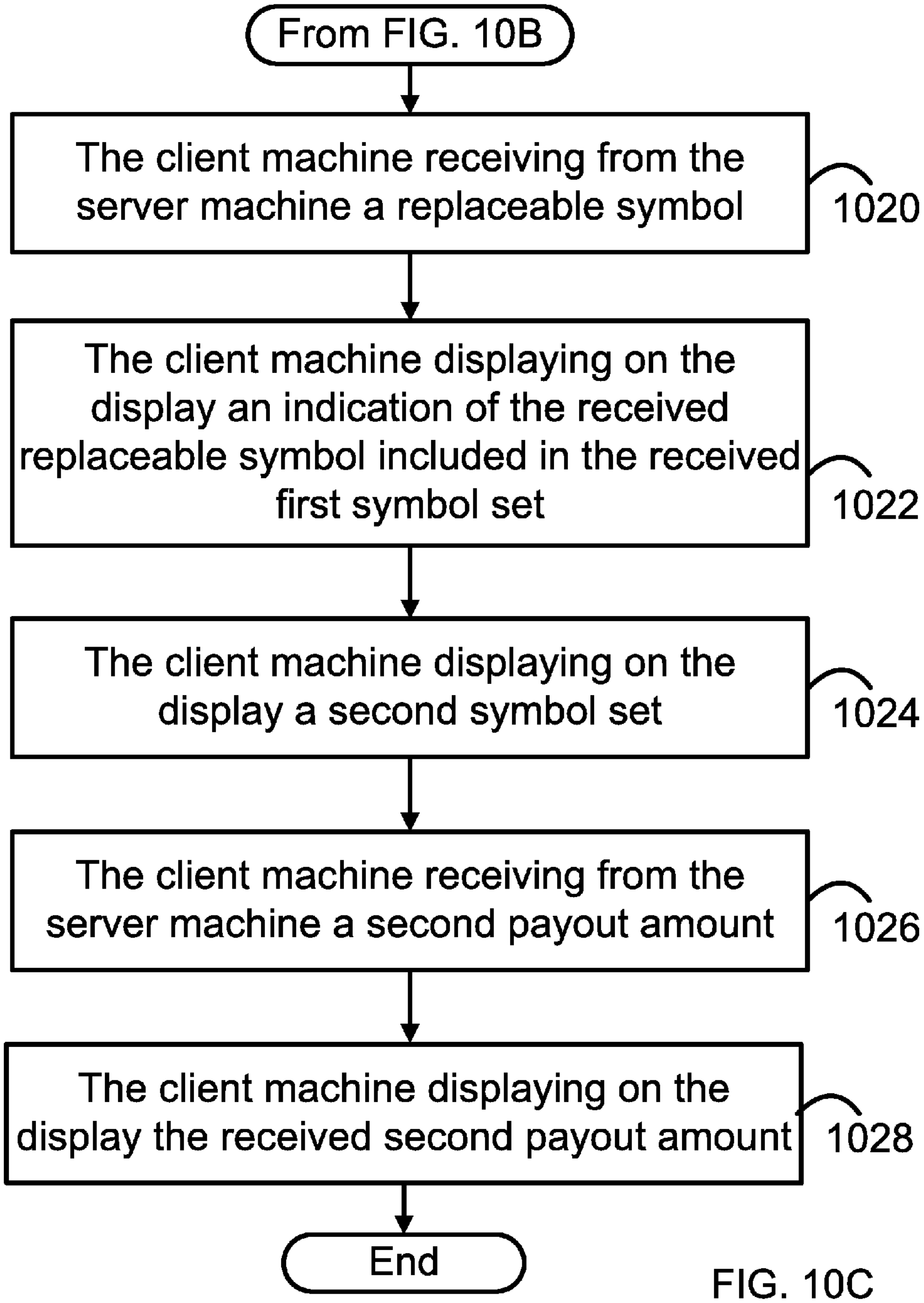
FIG. 10C is a third part of the flow chart of FIG. 10A.

FIGS. 10A-10C) show a flow chart showing functions in accordance with an example method in connection with the client machine 100*b*. Note that several of the functions described in connection with FIGS. 10A-10C parallel functions described in connection with FIGS. 3A-3C and 9A-9C. As such, variations of the functions described in connection with FIGS. 3A-3C and 9A-9C are likewise applicable to the functions described in connection with FIG. 10. However, for the sake of brevity, these variations are not repeated.

FIGS. 10A-10C show a flow chart depicting functions in accordance with an example method relating to a wager game.

At block 1000, the method may involve the client machine 100*b* receiving a first wager via the user interface 104*b*. At block 1002, the method may involve the client machine 100*b* receiving a spin request via the user interface 104*b*. At block 1004, the method may involve the client machine 100*b* sending the received first wager to the server machine 100*a*.

At block 1006, the method may involve the client machine 100*b* sending the spin request to the server machine 100*a*. In one example, the client machine 100*b* receives the first symbol set from the server machine 100*a* in response to the client machine 100*b* sending the spin request to the server machine 100*a*. At block 1008, the method may involve the client machine 100*b* receiving from the server machine 100*a* a first symbol set, where the first symbol set includes at least two symbols from a global symbol group.

At block 1010, the method may involve the client machine 100*b* receiving from the server machine 100*a* a first payout amount (e.g., a number representing an amount of cash to be paid out to the player), responsive to sending the received first wager to the server machine 100*a*. In one example, the first payout amount is a function of the received first symbol set and the received first wager. At block 1012, the method may involve the client machine 100*b* displaying on the display 110*a* the received first payout amount.

At block 1014, the method may involve the client machine 100*b* displaying on the display 110*b* the received first symbol set. At block 1016, the method may involve the client machine 100*b* receiving a second wager via the user interface 104*b*. At block 1018, the method may involve the client machine 100*b* sending the received second wager to the server machine 100*a*.

At block 1020, the method may involve the client machine 100*b* receiving from the server machine 100*a* a replaceable symbol. At block 1022, the method may involve the client machine 100*b* displaying on the display 110*b* an indication of the received replaceable symbol included in the received first symbol set. At block 1024, the method may involve the client machine 100*b* displaying on the display, a second symbol set, where the displayed second symbol set is identical to the displayed first symbol set, except that each received replaceable symbol included in the displayed first symbol set is replaced by the received replacement symbol.

At block 1026, the method may involve the client machine 100*b* receiving from the server machine 100*a* a second payout amount. In one example, the second payout amount is a function of the second symbol set and the received second wager. At block 1028, the method may involve the client machine 100*b* displaying on the display 110*b* the received second payout amount.

In summary, disclosed herein are machines and methods that relate to a symbol replacement feature in a wager game. In one aspect, a machine is disclosed that includes a display configured to display a symbol set in a wager game, a processor, and a non-transitory computer readable medium storing software instructions, that when executed by the processor, perform a set of functions. The set of functions includes (i) selecting a first symbol set from a global symbol group, wherein the first symbol set includes at least two symbols, (ii) displaying on the display the selected first symbol set, (iii) determining that a trigger event occurred, (iv) responsive to determining that the trigger event occurred, selecting a replaceable symbol from a replaceable symbol group, wherein the replaceable symbol group is a subset of the global symbol group, (v) selecting a replacement symbol from the global symbol group, and (vi) displaying on the display, a second symbol set, wherein the displayed second symbol set is identical to the displayed first symbol set, except that each selected replaceable symbol included in the selected first symbol set is replaced by the selected replacement symbol.

In another aspect, a server machine is disclosed. The server machine is configured to communicate with a client machine over a computer network, the client machine including a display configured to display a symbol set in a wager game. The server machine includes a processor and a non-transitory computer readable medium storing software instructions, that when executed by the processor, perform a set of functions. The set of functions includes: (i) selecting a first symbol set from a global symbol group, wherein the first symbol set includes at least two symbols, (ii) sending the selected first symbol set to the client machine to display on the display, (iii) determining that a trigger event occurred, (iv) responsive to determining that the trigger event occurred, selecting a replaceable symbol from a replaceable symbol group, wherein the replaceable symbol group is a subset of the global symbol group (v) sending the selected replaceable symbol to the client machine, (vi) selecting a replacement symbol from the global symbol group, and (vii) sending the selected replacement symbol to the client machine for displaying on the display a second symbol set, wherein the displayed second symbol set is identical to the displayed first symbol set, except that each selected replaceable symbol included in the displayed first symbol set is replaced by the selected replacement symbol.

In another aspect, a client machine is disclosed. The client machine is configured to communicate with a server machine over a computer network. The client machine includes a display configured to display a symbol set of a wager game, a processor, and a non-transitory computer readable medium storing software instructions, that when executed by the processor, perform a set of functions. The set of functions includes: (i) receiving from the server machine a first symbol set, wherein the first symbol set includes at least two symbols from a global symbol group, (ii) displaying on the display the received first symbol set, (iii) receiving from the server machine a replaceable symbol, wherein the replaceable symbol is from a replaceable symbol group, and wherein the replaceable symbol group is a subset of the global symbol group, and (iv) displaying on the display, a second symbol set, wherein the displayed second symbol set is identical to the displayed first symbol set, except that each received replaceable symbol included in the displayed first symbol set is replaced by the received replacement symbol.

In another aspect, a method for use with a display configured to display a symbol set in a wager game is disclosed. The method involves: (i) selecting, using a processor, a first symbol set from a global symbol group, wherein the first symbol set includes at least two symbols, (ii) displaying on the display the selected first symbol set; (iii) determining that a trigger event occurred (iv) responsive to determining that the trigger event occurred, selecting a replaceable symbol from a replaceable symbol group, wherein the replaceable symbol group is a subset of the global symbol group, (v) selecting a replacement symbol from the global symbol group, and (vi) displaying on the display, a second symbol set, wherein the displayed second symbol set is identical to the displayed first symbol set, except that each selected replaceable symbol included in the selected first symbol set is replaced by the selected replacement symbol.

An example method in accordance with the disclosure may involve: (i) selecting, using a processor, a first symbol set from a global symbol group, wherein the first symbol set includes at least two symbols; (ii) displaying on a display the selected first symbol set; (iii) determining that a trigger event occurred; (iv) responsive to determining that the trigger event occurred, selecting a replaceable symbol from a replaceable symbol group, wherein the replaceable symbol group is a subset of the global symbol group; (v) selecting a replacement symbol from the global symbol group; and (vi) displaying on the display, a second symbol set, wherein the displayed second symbol set is identical to the displayed first symbol set, except that each selected replaceable symbol included in the selected first symbol set is replaced by the selected replacement symbol.

While one or more functions of the presently disclosed method have been described as being performed by the certain entities (e.g., the machine 100, the server machine 100*a*, or the client machine 100*b*), one or more of the functions may be performed by any entity, including but not limited to those described herein. As such, while this disclosure includes examples in which the server machine 100*a* performs select functions and sends data to the client machine 100*b*, such that the client machine 100*b* may perform complementing functions and receive the data, variations may to those functions may be made while adhering to the general server client dichotomy and the scope of the disclosed machines and methods.

For example, rather than the server machine 100*a* sending select data (e.g., a symbol set) to the client machine 100*b*, such that the client machine may generate and display appropriate images, the server machine 100*a* may itself generate the images and send them to the client machine 100*b* for display. Indeed, it will be appreciated by one of ordinary skill in the art that the "break point" between the server machine's functions and the client machine's functions may be varied with ease.

Further, the described functions throughout this application need not be performed in the disclosed order, although in some examples, the recited order may be preferred. Also, not all functions need to be performed to achieve the desired advantages of disclosed machines and methods, and therefore not all functions are required. For example, the method may not involve the function at block 314 where a second wager is received.

While examples have been described in terms of select embodiments, alterations and permutations of these embodiments will be apparent to those of ordinary skill in the art. Other changes, substitutions, and alterations are also possible without departing from the disclosed machines and methods in their broader aspects as set forth in the following claims.

The invention claimed is:

1. A method comprising:

selecting a first symbol set from a global symbol group;

receiving a first wager via a user interface before selecting the first symbol set;

displaying the first symbol set, wherein the first symbol set includes at least two symbols;

determining, using a stored payout table, a first payout amount, wherein the first payout amount is a function of the first symbol set and the received first wager;

displaying the determined first payout amount;

determining that a trigger event has occurred;

responsive to determining that the trigger event has occurred, identifying at least two symbols in the first symbol set that are in a replaceable symbol group which is a subset of the global symbol group;

for the identified at least two symbols in the first symbol set which are in the replaceable symbol group, making one selection of a replacement symbol that is in the global symbol group;

displaying a second symbol set consisting of (i) the symbols in the first symbol set which are not in the replaceable symbol group, and (ii) for each of the identified at least two replacement symbols, the selected replacement symbol;

receiving a second wager via the user interface after selecting the first symbol set and before displaying the second symbol set;

determining, using the payout table, a second payout amount, wherein the second payout amount is a function of the second symbol set and the second wager; and displaying the determined second payout amount.

2. The method of claim 1, further comprising:

receiving a user request, via a user interface, to display a set of symbols; and responsive to receiving the user request, selecting the first symbol set from the global symbol group; and wherein determining that the trigger event has occurred comprises determining that the first symbol set includes a trigger symbol.

3. The method of claim 1, further comprising:

for any symbol included in the first symbol set which is in the replaceable symbol group, displaying an indication that that symbol is a replaceable symbol.

4. The method of claim 1, wherein the first symbol set includes multiple sub sets and the global symbol group includes multiple sub groups, each sub group corresponding to one of the sub sets, and wherein selecting the first symbol set from the global symbol group comprises selecting each sub set from the corresponding sub group.

5. The method of claim 4, wherein the first symbol set is displayed in a column and row arrangement and each sub set is displayed in a corresponding column.

6. The method of claim 5, wherein the symbols of the first symbol set are displayed on a row across a plurality of reels each containing the symbols of the global symbol group.

7. The method of claim 6, wherein displaying the first symbol set comprises superimposing each sub set over a corresponding reel.

8. The method of claim 1, wherein selecting the one replacement symbol comprises using a random number generator to select the one replacement symbol.

9. The method of claim 1, wherein selecting the one replacement symbol comprises selecting one predetermined replacement symbol.

10. A machine comprising:

a display configured to display a symbol set in a wager game;

a processor; and a non-transitory computer readable medium storing a payout table and software instructions, that when executed by the processor, perform a set of functions, the set of functions comprising:

selecting a first symbol set from a global symbol group, wherein the first symbol set includes at least two symbols;

receiving a first wager via a user interface before selecting the first symbol set;

displaying on the display the selected first symbol set;

determining, using the stored payout table, a first payout amount, wherein the first payout amount is a function of the selected first symbol set and the received first wager;

displaying on the display the determined first payout amount;

determining that a trigger event occurred;

responsive to determining that the trigger event occurred, selecting at least two replaceable symbols from a replaceable symbol group, wherein the replaceable symbol group is a subset of the global symbol group;

making one selection of a replacement symbol from the global symbol group;

displaying on the display, a second symbol set, wherein the displayed second symbol set is identical to the displayed first symbol set, except that each of the selected at least two replaceable symbols included in the selected first symbol set is replaced by the selected replacement symbol;

receiving a second wager via the user interface after selecting the first symbol set and before displaying the second symbol set;

determining, using the stored payout table, a second payout amount, wherein the second payout amount is a function of the displayed second symbol set and the received second wager; and displaying on the display the determined second payout amount.

11. The machine of claim 10, wherein the selected first symbol set includes multiple sub sets, wherein the global symbol group includes multiple sub groups, each sub group corresponding to one of the sub sets, and wherein selecting the first symbol set from the global symbol group comprises selecting each sub set from the corresponding sub group.

12. The machine of claim 11, wherein displaying on the display the selected first symbol set comprises displaying the selected first symbol set in a column and row arrangement, wherein each sub set is displayed in a corresponding column.

13. The machine of claim 12, wherein each symbol in the selected first symbol set is associated with an arrangement position in the column and row arrangement, and wherein displaying the selected first symbol set in a column and row arrangement comprises displaying each symbol in the selected first symbol set according to the corresponding arrangement position.

14. The machine of claim 13, wherein displaying on the display the selected first symbol set comprises superimposing each sub set over a corresponding virtual reel.

15. The machine of claim 10, wherein determining that the trigger event occurred comprises determining that the selected first symbol set includes a trigger symbol, the set of functions further comprising displaying on the display the selected replacement symbol superimposed over a virtual reel that is superimposed over the displayed trigger symbol.

16. A server machine configured to communicate with a client machine over a computer network, the client machine including a display configured to display a symbol set in a wager game, the server machine comprising:

a processor; and a non-transitory computer readable medium storing a payout table and software instructions, that when executed by the processor, perform a set of functions, the set of functions comprising:

selecting a first symbol set from a global symbol group, wherein the first symbol set includes at least two symbols;

receiving a first wager from the client machine before selecting the first symbol set;

sending the selected first symbol set to the client machine to display on the display;

determining, using the stored payout table, a first payout amount, wherein the first payout amount is a function of the selected first symbol set and the received first wager;

sending the determined first payout amount to the client machine to display on the display;

determining that a trigger event occurred;

responsive to determining that the trigger event occurred, selecting at least two replaceable symbols from a replaceable symbol group, wherein the replaceable symbol group is a subset of the global symbol group;

sending the selected at least two replaceable symbols to the client machine;

making one selection of a replacement symbol from the global symbol group;

sending the selected replacement symbol to the client machine for displaying on the display a second symbol set, wherein the displayed second symbol set is identical to the displayed first symbol set, except that each of the selected at least two replaceable symbols included in the displayed first symbol set is replaced by the selected replacement symbol;

receiving a second wager from the client machine after selecting the first symbol set and before selecting the replaceable symbol;

determining, using the stored payout table, a second payout amount, wherein the second payout amount is a function of the second symbol set and the received second wager; and sending the determined second payout amount to the client machine for display on the display.

17. A client machine configured to communicate with a server machine over a computer network, the client machine comprising:

a display configured to display a symbol set of a wager game;

a processor; and a non-transitory computer readable medium storing software instructions, that when executed by the processor, perform a set of functions, the set of functions comprising:

receiving from the server machine a first symbol set, wherein the first symbol set includes at least two symbols from a global symbol group;

displaying on the display the received first symbol set;

receiving a first wager via a user interface before receiving the first symbol set;

sending the received first wager to the server machine;

receiving from the server machine a first payout amount, responsive to sending the received first wager to the server machine, wherein the first payout amount is a function of the received first symbol set and the received first wager;

displaying on the display the received first payout amount;

receiving from the server machine at least two replaceable symbols, wherein the at least two replaceable symbols are from a replaceable symbol group, and wherein the replaceable symbol group is a subset of the global symbol group;

receiving from the server machine a replacement symbol, wherein one selection of the replacement symbol was made;

displaying on the display, a second symbol set, wherein the displayed second symbol set is identical to the displayed first symbol set, except that each of the received at least two replaceable symbols included in the displayed first symbol set is replaced by the received replacement symbol;

receiving a second wager via the user interface after receiving the first payout amount and before receiving the replaceable symbol;

sending the received second wager to the server machine;

receiving from the server machine a second payout amount, responsive to sending the received second wager to the server machine, wherein the second payout amount is a function of the second symbol set and the received second wager; and displaying on the display the received second payout amount.

* * * * *